United States Patent
Schmid et al.

(10) Patent No.: US 6,800,699 B2
(45) Date of Patent: Oct. 5, 2004

(54) PROCESS FOR THE PRODUCTION OF AQUEOUS POLYMER DISPERSIONS

(75) Inventors: Markus Schmid, Deidesheim (DE); Mubarik Mahmood Chowdhry, Strasbourg (FR); Marc Oliver Kristen, Limburgerhof (DE); Stefan Mecking, Freiburg (DE); Florian M. Bauers, Freiburg (DE)

(73) Assignee: BASF Aktiengesellschaft, Ludwigshafen (DE)

(*) Notice: Subject to any disclaimer, the term of this patent is extended or adjusted under 35 U.S.C. 154(b) by 332 days.

(21) Appl. No.: 10/015,752

(22) Filed: Dec. 17, 2001

(65) Prior Publication Data
US 2003/0114570 A1 Jun. 19, 2003

(51) Int. Cl.$^7$ ............... C08F 4/44; C08F 2/24; C08F 2/30; C08L 23/04
(52) U.S. Cl. ............... 526/93; 524/804; 524/836
(58) Field of Search ............... 524/804, 836; 526/93

(56) References Cited

U.S. PATENT DOCUMENTS

| | | | |
|---|---|---|---|
| 3,635,937 A | 1/1972 | Bauer et al. | 260/94 |
| 3,637,636 A | 1/1972 | Bauer et al. | 260/94 |
| 3,661,803 A | 5/1972 | Bauer et al. | 252/431 |
| 3,686,159 A | 8/1972 | Banner et al. | 260/94 |
| 4,698,403 A | 10/1987 | Klabunde | 526/126 |
| 4,716,205 A | 12/1987 | Klabunde | 526/115 |
| 5,574,091 A | 11/1996 | Walther et al. | 524/570 |

FOREIGN PATENT DOCUMENTS

| | | |
|---|---|---|
| EP | 0 046 328 | 2/1982 |
| FR | 2 784 110 | 4/2000 |
| WO | WO 97/17380 | 5/1997 |
| WO | WO 98/42664 | 10/1998 |
| WO | WO 98/42665 | 10/1998 |
| WO | WO 00/20464 | 4/2000 |
| WO | WO 01/44325 | 6/2001 |

OTHER PUBLICATIONS

R. Cramer "D1μ–Chlorotetrakis(ethylene)Dirhodium(1), 2,4–Pentanedionatobis(Ethylene)Rhodium(1), D1–μ–Chlorotertracarbonyldirhodium(1)" Inorgan. Synthesis vol. XV (1974) p. 14–18.

Bauers et al. "Aqueous Homo– and Copolymerization of Ethylene by Neutral Nickel(II) Complexes" Macromolecules vol. 34 (2001) pp. 1165–1171.

Tang et al. "Miniemulsion Polymeization—A Comparative Study of Preparative Variables" Jnl. Applied Polymer Science. vol. 43 (1991) pp. 1059–1066.

Nelson et al. "Polymerization and 1D and 2D NMR Analysis of Alpha–Olefins from Late Transition Metal Catalysts" Polymer Preprints vol. 38 (1997) p. 133.

Killian et al. "Living Polymerization of α–Olefins Using $Ni^2$–αDiimine Catalysts. Synthesis of New Block Polymers Based on α–Olefins" J. Am. Chem. Soc. vol. 118 (1996) pp. 11664–11665.

Johnson et al. "New Pd(II)– and Ni(II)–Based Catalysts for Polymerization of Ethylene and α–Olefins" J. Am. Chem. Soc. vol. 117 (1995) pp. 6414–6415.

Keim et al. "Novel Coordination of (Benzoylmethylene)triphenylphosphorane in a Nickel Oligomerization Catalyst" Angew. Chem. Int. Ed. vol. 17 No. 6 (1978) pp. 466.

Wang et al. J. Am. Chem. Soc. vol. 115 (1993) pp. 699–7000.

Brintzinger et al. "Stereospecific Olefin Polymerization with Chrial Metallocene Catalysts" Angew. Chem. Intl. Ed. vol. 34 (1995) pp. 1143–1170.

Principles of Polymer Systems (1983) pp. 384.

*Primary Examiner*—Tae H. Yoon
(74) *Attorney, Agent, or Firm*—Keil & Weinkauf

(57) ABSTRACT

Process for the production of aqueous polymer dispersions by reaction of one or more olefinically unsaturated compounds in aqueous medium in the presence of a complex compound which possesses the structural element Y—M—E, E standing for nitrogen, M for a transition metal of groups 7 to 10 of the periodic system of the elements and Y for oxygen, sulfur, nitrogen or phosphorus, and which possesses no hydrophilic groups in its ligand system.

15 Claims, No Drawings

PROCESS FOR THE PRODUCTION OF AQUEOUS POLYMER DISPERSIONS

DESCRIPTION

The present invention relates to a process for the production of aqueous polymer dispersions by the reaction of one or more olefinically unsaturated compounds [olefin(s)] in aqueous medium in the presence of a1) a complex compound of the general formula Ia and/or Ib

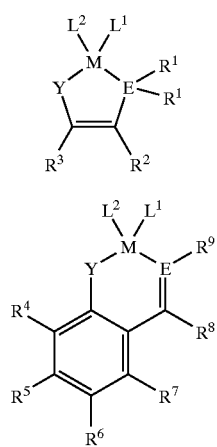

in which the substituents and indices have the following meaning:

M a transition metal of groups 7 to 10 of the periodic system of the elements, $L^1$ phosphanes $(R^{16})_x PH_{3-x}$ or amines $(R^{16})_x NH_{3-x}$ having identical or different substituents $R^{16}$, ethers $(R^{16})_2 O$, $H_2 O$, alcohols $(R^{16})OH$, pyridine, pyridine derivatives of the formula $C_5 H_{5-x}(R^{16})_x N$, CO, $C_1$–$C_{12}$ alkyl nitriles, $C_6$–$C_{14}$ aryl nitriles or ethylenically unsaturated double-bonded systems, x standing for an integer between 0 and 3, $L^2$ halide ions, amide ions $(R^{16})_h NH_{2-h}$, h standing for an integer between 0 and 2, and furthermore $C_1$–$C_6$ alkyl anions, allyl anions, benzyl anions or aryl anions, wherein $L^1$ and $L^2$ can be linked to one another by means of one or more covalent bonds, E nitrogen, Y oxygen, sulfur, N-$R^{10}$ or P-$R^{10}$, $R^1$ hydrogen, $C_1$–$C_{12}$ alkyl groups, $C_7$–$C_{13}$ aralkyl substituents or $C_6$–$C_{14}$ aryl groups, $R^2$, $R^3$ independently of one another hydrogen,
  $C_1$–$C_{12}$ alkyl, wherein the alkyl groups can be branched or unbranched,
  $C_1$–$C_{12}$ alkyl, singly or multiply substituted by identical or different $C_1$–$C_{12}$ alkyl groups, halogens, $C_1$–$C_{12}$ alkoxy groups or $C_1$–$C_{12}$ thioether groups,
  $C_7$–$C_{13}$ aralkyl,
  $C_3$–$C_{12}$ cycloalkyl,
  $C_3$–$C_{12}$ cycloalkyl, singly or multiply substituted by identical or different $C_1$–$C_{12}$ alkyl groups, halogens, $C_1$–$C_{12}$ alkoxy groups or $C_1$–$C_{12}$ thioether groups,
  $C_6$–$C_{14}$ aryl,
  $C_6$–$C_{14}$ aryl, identically or differently substituted by one or more $C_1$–$C_{12}$ alkyl groups, halogens, singly or multiply halogenated $C_1$–$C_{12}$ alkyl groups, $C_1$–$C_{12}$ alkoxy groups, silyloxy groups $OSiR^{11}R^{12}R^{13}$, amino groups $NR^{14}R^{15}$ or $C_1$–$C_{12}$ thioether groups,
  $C_1$–$C_{12}$ alkoxy groups,
  silyloxy groups $OSiR^{11}R^{12}R^{13}$,
  halogens or
  amino groups $NR^{14}R^{15}$,
  wherein the substituents $R^2$ and $R^3$ can form a saturated or unsaturated 5- to 8-membered ring with one another, $R^4$ to $R^7$ independently of one another hydrogen,
  $C_1$–$C_{12}$ alkyl, wherein the alkyl groups can be branched or unbranched,
  $C_1$–$C_{12}$ alkyl, singly or multiply substituted by identical or different $C_1$–$C_{12}$ alkyl groups, halogens, $C_1$–$C_{12}$ alkoxy groups or $C_1$–$C_{12}$ thioether groups,
  $C_7$–$C_{13}$ aralkyl,
  $C_3$–$C_{12}$ cycloalkyl,
  $C_3$–$C_{12}$ cycloalkyl, singly or multiply substituted by identical or different $C_1$–$C_{12}$ alkyl groups, halogens, $C_1$–$C_{12}$ alkoxy groups or $C_1$–$C_{12}$ thioether groups,
  $C_6$–$C_{14}$ aryl,
  $C_6$–$C_{14}$ aryl, identically or differently substituted by one or more $C_1$–$C_{12}$ alkyl groups, halogens, singly or multiply halogenated $C_1$–$C_{12}$ alkyl groups, $C_1$–$C_{12}$ alkoxy groups, silyloxy groups $OSiR^{11}R^{12}R^{13}$, amino groups $NR^{14}R^{15}$ or $C_1$–$C_{12}$ thioether groups,
  $C_1$–$C_{12}$ alkoxy groups,
  silyloxy groups $OSiR^{11}R^{12}R^{13}$,
  halogens,
  $NO_2$ groups or
  amino groups $NR^{14}R^{15}$,
  wherein pairs of neighboring substituents $R^4$ to $R^7$ can form a saturated or unsaturated 5- to 8-membered ring with one another, $R^8$, $R^9$ independently of one another in hydrogen,
  $C_1$–$C_6$ alkyl groups,
  $C_7$–$C_{13}$ aralkyl substituents or
  $C_6$–$C_{14}$ aryl groups, optionally substituted by one or more $C_1$–$C_{12}$ alkyl groups, halogens, singly or multiply halogenated $C_1$–$C_{12}$ alkyl groups, $C_1$–$C_{12}$ alkoxy groups, silyloxy groups $OSiR^{11}R^{12}R^{13}$, amino groups $NR^{14}R^{15}$ or $C_1$–$C_{12}$ thioether groups, $R^{10}$ to $R^{15}$ independently of one another hydrogen,
  $C_1$–$C_{20}$ alkyl groups, which on their part may be substituted by $O(C_1$–$C_6$ alkyl) or $N(C_1$–$C_6$ alkyl)$_2$ groups,
  $C_3$–$C_{12}$ cycloalkyl groups,
  $C_7$–$C_{13}$ aralkyl substituents or $C_6$–$C_{14}$ aryl groups, $R^{16}$ hydrogen,
  $C_1$–$C_{20}$ alkyl groups, which for their part may be substituted by $O(C_1$–$C_6$ alkyl) or $N(C_1$–$C_6$ alkyl)$_2$ groups,
  $C_3$–$C_{12}$ cycloalkyl groups,
  $C_7$–$C_{13}$ aralkyl substituents or $C_6$–$C_{14}$ aryl groups, b) dispersing agents and optionally c) organic solvents having low solubility in water, d) the metal complexes a1) being dissolved in a portion or the total quantity of the olefinically unsaturated compounds and/or of the organic solvents c) having low solubility in water and e) the portion or the total quantity of the olefinically unsaturated compounds and/or of the organic solvents c) having low solubility in water which hold the metal complexes a1) in solution being present in the aqueous medium as a dispersed phase having an average droplet diameter $\leq 1,000$ nm.

Aqueous polymer dispersions are used commercially in numerous highly diverse applications. Examples which may be mentioned are paper applications (coating and surface sizing), raw materials for surface coatings and paints, adhesives raw materials (including pressure-sensitive adhesives), textile and leather applications, building chemicals, molded foams (mattresses, carpet backings) as well as medical and pharmaceutical products, for example as binding agents for preparations. A summary may be found in D. Distler (editor) "Wässrige Polymerdispersionen [Aqueous polymer dispersions]", Wiley-VCH Verlag, 1st edition, 1999.

The common processes for the production of aqueous polymer dispersions from the olefins: ethene, propene and/or 1-butene make use of either free-radical high-pressure polymerization or alternatively of the production of secondary dispersions. These processes suffer from disadvantages. The free-radical polymerization process requires extremely high pressures, they are limited on the industrial scale to ethylene and ethylene copolymers and the equipment required is very expensive to procure and maintain (F. Rodriguez, Principles of Polymer Systems, 2nd edition, McGraw-Hill, Singapore 1983, page 384). Another method consists in that first of all the aforesaid olefins are polymerized by any particular process and then a secondary dispersion is prepared, as described by way of example in U.S. Pat. No. 5,574,091. This method is a multistage process and hence very expensive.

It was, accordingly, desirable to produce aqueous polymer dispersions from olefins, such as the olefins ethylene, propylene, butylene, etc., available on an industrial scale in one process step by polymerization of the olefins in aqueous medium. In addition, polymerization in aqueous medium quite generally has the advantage that it is simple to dissipate the heat of polymerization due to the nature of the process. Finally, polymerization reactions in aqueous systems are quite generally of interest simply because water is an inexpensive and environmentally friendly solvent.

The following state of the art forms the starting point for the metal-complex catalyzed polymerization of olefins.

Olefins can be polymerized using electrophilic transition metal compounds such as $TiCl_4$ (Ziegler-Natta catalyst) or metallocenes as described by way of example by H.-H. Brintzinger et al. in Angew. Chem. 1995, 107, pages 1255 et seq. and Angew. Chem., Int. Ed. Engl. 1995, 34, pages 1143 et seq. However, both $TiCl_4$ and metallocene are sensitive to moisture and are, therefore, not very suitable for the polymerization of olefins in aqueous medium. The aluminum alkyls employed as cocatalysts are also sensitive to moisture so that water as an anticatalyst must be carefully excluded.

There are just a few reports on transition-metal catalyzed reactions of olefins, such as ethylene for example, in aqueous conditions. Thus, L. Wang et al. in J. Am. Chew. Soc. 1993, 115, pages 6999 et seq. report on a rhodium-catalyzed polymerization. With about one insertion/hour, however, the activity is much too low for industrial applications.

The reaction of ethylene with nickel P, O-chelate complexes as described in the US specifications U.S. Pat. Nos. 3,635,937, 3,637,636, 3,661,803 and 3,686,159 appears distinctly promising. It is disadvantageous that the reported activities are too low.

EP-A 46331 and EP-A 46328 report on the reaction of ethylene with Ni chelate complexes of the general formula A, R being identical or different organic substituents of which one carries a sulfonyl group and F stands for phosphorus, arsenic or nitrogen.

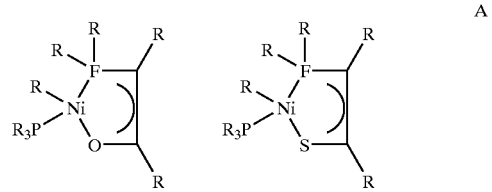

Under the selected reaction conditions in solvents such as methanol or mixtures of methanol and a hydrocarbon only oligomers were obtained which are unsuitable for the applications referred to above. The advantage of sulfonated derivatives by comparison with unsulfonated compounds, as described by W. Keim et al. in Angew. Chem. 1978, 90, pages 493 et seq.; Angew. Chem., Int. Ed. Engl. 1978, 6, pages 466 et seq., lies in their higher activity.

U.S. Pat. No. 4,698,403 (column 7, lines 13–18) and U.S. Pat. No. 4,716,205 (column 6, lines 59–64) disclose that an excess of water acts as a catalyst poison to bidentate Ni chelate complexes even when they are carrying a $SO_3$- group.

From the documents cited above it is evident that numerous Ni complexes are not active in polymerization in the presence of water.

On the other hand WO 97/17380 discloses that palladium compounds of formula B

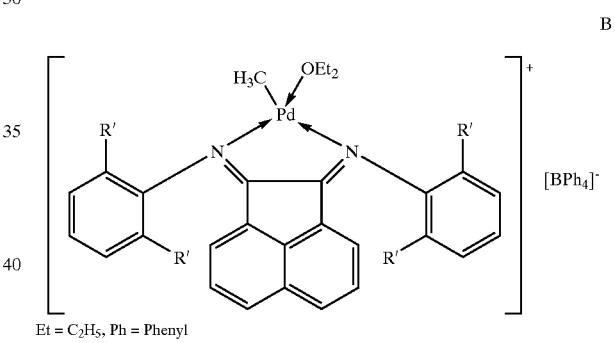

Et = $C_2H_5$, Ph = Phenyl in which R' stands for isopropyl groups for example, or the analogous nickel compounds of higher olefins such as 1-octene can polymerize in an aqueous environment. Optionally, an emulsifier can be added in order to facilitate polymerization. It is, however, pointed out that the temperature should not exceed 40° C. as otherwise the catalyst is deactivated (page 25, lines 5 et seq.). However, higher reaction temperatures are generally desirable because as a result the activity of a catalyst system can be increased.

Furthermore, it is disadvantageous in catalyst systems of the general formula B that with ethylene they usually give rise to highly branched polymers (L. K. Johnson J. Am. Chem. Soc. 1995, 117, pages 6414 et seq.; C. Killian, J. Am. Chem. Soc. 1996, 118, pages 11664 et seq.) which to date are of lesser industrial importance, and with higher α-olefins (L. T. Nelson Polymer Preprints 1997, 38, pages 133 et seq.) what is known as "chain running" of the active complexes is observed. Chain running results in a large number of faulty 1,ω-insertions and due to this amorphous polymers are usually produced which are not very suitable as working materials.

WO 98/42665 further discloses that complexes of the general formula C,

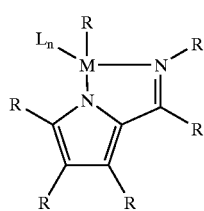

C with M=Ni or Pd and n neutral ligands L, are active in polymerization in the presence of small quantities of water without suffering any losses in catalytic activity (page 16, line 13). These quantities of water, however, must not exceed 100 equivalents with reference to the complex (page 16, lines 30 and 31). Under these conditions, however, polymerization cannot be carried out in aqueous medium.

Furthermore, WO 98/42664 discloses that complexes of the general formula D,

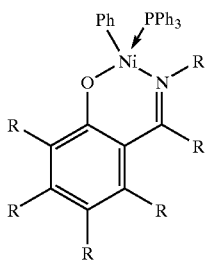

D

Ph = Phenyl having identical or different substituents R, should also be able to polymerize ethylene in the presence of small quantities of water (see page 17, lines 14 et seq.). These quantities of water, however, should not exceed 100 equivalents with reference to the complex (page 17, lines 33 to 35). Under these conditions, however, polymerization in aqueous medium is not conceivable.

FR-A 2784110 discloses a method for the polymerization of olefins in the presence of water which makes use of catalysts possessing a structural element E—M—X. Here E should be an oxygen or sulfur atom, M nickel, palladium or platinum and X a phosphorus, arsenic or antimony atom. Water-soluble as well as water-insoluble metal complexes are employed for the polymerization reaction, both filterable polymers and polymers in the form of a stable dispersion being obtained. The polymers obtained in the examples exhibited number average molecular weights ($M_n$) of approx. 850 to 3,400 g/mol for a very wide spread of molecular weights.

WO 01/44325 discloses a process for the production of ethylene homopolymers and copolymers in an aqueous medium. The disclosed catalyst systems are water-soluble due to hydrophilic groups in the ligands of the complex. Depending on the catalyst used and on the mass fraction of organic solvent both filterable polymers as well as polymers in the form of a stable dispersion were obtained.

Accordingly, the task was to provide a process for the production of aqueous polymer dispersions by the polymerization of olefins in aqueous medium in the presence of transition-metal complex catalysts which possess a structural element Y—M—E, E standing for nitrogen, M for a transition metal of groups 7 to 10 of the periodic system of the elements and Y for oxygen, sulfur as well as nitrogen-containing or phosphorus-containing groups, and which have no hydrophilic groups in their ligand system. The task furthermore consisted in providing aqueous polymer dispersions whose olefin polymers exhibit high molecular weights while simultaneously having a narrow distribution of molecular weights.

Surprisingly, it was now found that aqueous olefin polymer dispersions whose polymers exhibit high molecular weights while simultaneously having a narrow distribution of molecular weights are obtained by the process described at the outset.

Olefins which may be identified as suitable for the process according to the invention for the production of homopolymers are: ethylene, propylene, 1-butene, 1-pentene, 1-hexene, 1-heptene, 1-octene, 1-decene and 1-icosene, and also branched olefins such as 4-methyl-1-pentene, vinylcyclohexene and vinylcyclohexane together with styrene, para-methylstyrene and para-vinylpyridine, ethylene and propylene being preferred. Ethylene is particularly preferred.

The copolymerization of two or more olefins also succeeds by the process according to the invention, wherein the coolefins used can be selected from the following groups:

nonpolar 1-olefins, such as for example ethylene, propylene, 1-butene, 1-pentene, 1-hexene, 1-heptene, 1-octene, 1-decene and 1-icosene, and also branched olefins such as for example 4-methyl-1-pentene, vinylcyclohexene and vinylcyclohexane together with styrene, para-methylstyrene and para-vinylpyridine, ethylene, propylene, 1-butene, 1-pentene, 1-hexene, 1-heptene, 1-octene and 1-decene being preferred;

olefins which contain polar groups, such as by way of example acrylic acid, $C_1$–$C_8$ alkyl acrylates, 2-hydroxyethyl acrylate, 3-hydroxypropyl acrylate, 4-hydroxybutyl acrylate, methacrylic acid, $C_1$–$C_8$ alkyl methacrylates, $C_1$–$C_6$ alkyl vinyl ethers and vinyl acetate, and also 10-undecenoic acid, 3-butenoic acid, 4-pentenoic acid, 5-hexenoic acid together with styrene-4-sulfonic acid. Acrylic acid, methyl acrylate, ethyl acrylate, n-butyl acrylate, 2-ethylhexyl acrylate, 2-hydroxyethyl acrylate, methyl methacrylate, ethyl methacrylate, n-butyl methacrylate, ethyl vinyl ether, vinyl acetate, 10-undecenoic acid, 3-butenoic acid, 4-pentenoic acid and 5-hexenoic acid are preferred.

The proportion of coolefins in the olefin mixture to be polymerized is freely selectable and is usually ≦50 wt. %, frequently ≦40 wt. % and often ≦30 wt. % or ≦20 wt. %. If in particular olefins containing polar groups are employed for copolymerization their proportion in the olefin mixture to be polymerized is as a rule ≧0.1 wt. %, ≧0.2 wt. % or ≧0.5 wt. %, and ≦2 wt. %, ≦5 wt. % or ≦10 wt. %.

By preference exclusively ethylene is employed. If at least two olefins are used for polymerization these are frequently selected from the group comprising ethylene, propylene, 1-butene, 1-hexene and styrene. Ethylene is frequently employed in combination with propylene, 1-butene, 1-hexene or styrene.

In the complex compounds of the general formula Ia and Ib the substituents are defined as follows:

M is a transition metal of groups 7 to 10 of the periodic system of the elements, preferably manganese, iron, cobalt, nickel or palladium and by particular preference nickel, $L^1$ is selected from phosphanes of the formula $(R^{16})_xPH_{3-x}$ or amines of the formula $(R^{16})_xNH_{3-x}$, x standing for an integer between 0 and 3. Ethers $(R^{16})_2O$ such as diethyl ether or tetrahydrofuran, $H_2O$, alcohols ($R^{16}$) OH such as methanol or ethanol, pyridine, pyridine derivatives of the formula $C_5H_{5-x}(R^{16})_xN$, such as by way of example 2-picoline, 3-picoline, 4-picoline, 2,3-lutidine, 2,4-lutidine, 2,5-lutidine, 2,6-lutidine or 3,5-lutidine, CO, $C_1$–$C_{12}$ alkyl nitriles or $C_6$–$C_{14}$ aryl nitriles, such as acetonitrile, propionitrile, butyronitrile or benzonitrile are also suitable. Furthermore, singly or multiply ethylenically unsaturated double-bonded systems such as ethenyl, propenyl, cis-2-butenyl, trans-2-butenyl, cyclohexenyl or norbornenyl can also serve as ligand.

$L^2$ is selected from halide ions such as fluoride, chloride, bromide or iodide, preferably chloride or bromide, amide ions $(R^{16})_hNH_{2-h}$,A, h being an integer between 0 and 2, $C_1$–$C_6$ alkyl anions such as $CH_3^-$(Me$^-$), $(C_2H_5)^-$, $(C_3H_7)^-$, (n-$C_4H_9)^-$, (tert-$C_4H_9)^-$ or $(C_6H_{13})^-$, allyl anions or methallyl anions, benzyl anions or aryl anions such as $(C_6H_5)^-$.

In a particular embodiment $L^1$ and $L^2$ are linked to one another by one or more covalent bonds. Examples of such ligands are 1,5-cyclooctadienyl ("COD") ligands, 1,6-cyclodecenyl ligands or 1,5,9-all-trans-cyclododecatrienyl ligands.

In a further particular embodiment $L^1$ is tetramethylethylene diamine, only one nitrogen being coordinated to the metal.

E stands exclusively for nitrogen.

Y stands for oxygen, sulfur, N-$R^{10}$ or P-$R^{10}$, oxygen and sulfur being preferred.

$R^1$ is chosen from hydrogen $C_1$–$C_{12}$ alkyl, such as by way of example ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl and n-dodecyl; preferably $C_1$–$C_6$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, by particular preference $C_1$–$C_4$ alkyl such as methyl, ethyl, n-propyl, isopropyl, n-butyl, isobutyl, sec-butyl and tert-butyl, $C_7$–$C_{13}$ aralkyl, such as by way of example benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, by particular preference benzyl, $C_6$–$C_{14}$ aryl, such as by way of example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, and by particular preference phenyl.

$R^2$ and $R^3$ independently of one another stand for:

hydrogen, $C_1$–$C_{12}$ alkyl as defined above, $C_1$–$C_{12}$ alkyl, singly or multiply substituted by identical or different $C_1$–$C_{12}$ alkyl groups, halogens, such as fluorine, chlorine, bromine and iodine, preferably chlorine and bromine and $C_1$–$C_{12}$ alkoxy groups or $C_1$–$C_{12}$ thioether groups, the alkyl groups of these two groups being as defined above, $C_7$–$C_{13}$ aralkyl, as defined above, $C_3$–$C_{12}$ cycloalkyl, such as by way of example cyclopropyl, cyclobutyl, cyclopentyl, cyclohexyl, cycloheptyl, cyclooctyl, cyclononyl, cyclodecyl, cycloundecyl and cyclododecyl, preferably cyclopentyl, cyclohexyl and cycloheptyl, $C_3$–$C_{12}$ cycloalkyl, singly or multiply substituted by identical or different $C_1$–$C_{12}$ alkyl groups, halogens, $C_1$–$C_{12}$ alkoxy groups or $C_1$–$C_{12}$ thioether groups, such as by way of example 2-methylcyclopentyl, 3-methylcyclopentyl, cis-2,4-dimethylcyclopentyl, trans-2,4-dimethylcyclopentyl, 2,2,4,4-tetramethylcyclopentyl, 2-methylcyclohexyl, 3-methylcyclohexyl, 4-methylcyclohexyl, cis-2,5-dimethylcyclohexyl, trans-2,5-dimethylcyclohexyl, 2,2,5,5-tetramethylcyclohexyl, 2-methoxycyclopentyl, 2-methoxycyclohexyl, 3-methoxycyclopentyl, 3-methoxycyclohexyl, 2-chlorcyclopentyl, 3-chlorcyclopentyl, 2,4-dichlorcyclopentyl, 2,2,4,4-tetrachlorocyclopentyl, 2-chlorocyclohexyl, 3-chlorocyclohexyl, 4-chlorocyclohexyl, 2,5-dichlorocyclohexyl, 2,2,5,5-tetrachlorocyclohexyl, 2-thiomethylcyclopentyl, 2-thiomethylcyclohexyl, 3-thiomethylcyclopentyl, 3-thiomethylcyclohexyl and other derivatives, $C_6$–$C_{14}$ aryl, as defined above $C_6$–$C_{14}$ aryl, such as by way of example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, substituted on their part by one or more $C_1$–$C_{12}$ alkyl groups, as defined above, halogens, as defined above, singly or multiply halogenated $C_1$–$C_{12}$ alkyl groups, such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, preferably fluoromethyl, difluoromethyl, trifluoromethyl and perfluorobutyl, $C_1$–$C_{12}$ alkoxy groups, preferably $C_1$–$C_6$ alkoxy groups, such as by way of example methoxy, ethoxy, n-propoxy, isopropoxy, n-butoxy, isobutoxy, sec-butoxy, tert-butoxy, n-pentoxy, isopentoxy, n-hexoxy and isohexoxy, by particular preference methoxy, ethoxy, n-propoxy and n-butoxy, silyloxy groups OSi$R^{11}R^{12}R^{13}$, $R^{11}$ to $R^{13}$ independently of one another standing for hydrogen, $C_1$–$C_{20}$ alkyl groups, which on their part may be substituted by O($C_1$–$C_6$ alkyl) or N($C_1$–$C_6$ alkyl)$_2$ groups, $C_3$–$C_{12}$ cycloalkyl groups, $C_7$–$C_{13}$ aralkyl substituents or $C_6$–$C_{14}$ aryl groups, such as by way of example the trimethylsilyloxy, triethylsilyloxy, triisopropylsilyloxy, diethylisopropylsilyloxy, dimethylhexylsilyloxy, tert-butyldimethylsilyloxy, tert-butyldiphenylsilyloxy, tribenzylsilyloxy, triphenylsilyloxy and the tri-para-xylylsilyloxy group; the trimethylsilyloxy group and the tert-butyldimethylsilyloxy group being particularly preferred, amino groups N$R^{14}R^{15}$, $R^{14}$ und $R^{15}$ independently of one another standing for hydrogen, $C_1$–$C_{20}$ alkyl groups, which on their part may be substituted by O($C_1$–$C_6$ alkyl) or N($C_1$–$C_6$ alkyl)$_2$ groups, $C_3$–$C_{12}$ cycloalkyl groups, $C_7$–$C_{13}$ aralkyl substituents or $C_6$–$C_{14}$ aryl groups, it being also possible for $R^{14}$ and $R^{15}$ to form a saturated or unsaturated 5- to 8-membered ring, such as by way of example dimethylamino, diethylamino, diisopropylamino, methylphenylamino, diphenylamino, N-piperidyl, N-pyrrolidinyl, N-pyrryl, N-indolyl or N-carbazolyl, or $C_1$–$C_{12}$ thioether groups as defined above, $C_1$–$C_{12}$ alkoxy groups as defined, above, preferably $C_1$–$C_6$ alkoxy groups, such as methoxy, ethoxy, n-propoxy, isopropoxy, n-butoxy, isobutoxy, sec-butoxy, tert-butoxy, n-pentoxy, isopentoxy, n-hexoxy and isohexoxy, by particular preference methoxy, ethoxy, n-propoxy and n-butoxy, silyloxy groups $OSiR^{11}R^{12}R^{13}$ as defined above, halogens as defined above or amino groups $NR^{14}R^{15}$ as defined above, wherein the substituents $R^2$ and $R^3$ together with the C atoms of the parent substance can form a 5- to 8-membered saturated or unsaturated aliphatic or aromatic ring such as by way of example —$(CH_2)_3$— (trimethylene), —$(CH_2)_4$— (tetramethylene), —$(CH_2)_5$— (pentamethylene), —$(CH_2)_6$— (hexamethylene), —$CH_2$—CH=CH—, —$CH_2$—CH=CH—$CH_2$—, —CH=CH—CH=CH—, —O—$CH_2$—O—, —O—CHMe—O—, —CH—($C_6H_5$)—O—, —O—$CH_2$—$CH_2$—O—, —O—$CMe_2$—O—, —NMe—$CH_2$—$CH_2$—NMe—, —NMe— $CH_2$—NMe— or —O—$SiMe_2$—O—.

$R^4$ to $R^7$ independently of one another stand for:

hydrogen, $C_1$–$C_{12}$ alkyl as defined above, $C_1$–$C_{12}$ alkyl singly or multiply substituted by identical or different halogens, $C_1$–$C_{12}$ alkoxy groups or $C_1$–$C_{12}$ thioether groups as defined above, $C_7$–$C_{13}$ aralkyl as defined above, $C_3$–$C_{12}$ cycloalkyl as defined above, $C_3$–$C_{12}$ cycloalkyl singly or multiply substituted by identical or different $C_1$–$C_{12}$ alkyl groups, halogens, $C_1$–$C_{12}$ alkoxy groups or $C_1$–$C_{12}$ thioether groups as defined above, $C_6$–$C_{14}$ aryl as defined above, $C_6$–$C_{14}$ aryl identically or differently substituted by one or more $C_1$–$C_{12}$ alkyl groups, halogens, singly or multiply halogenated $C_1$–$C_{12}$ alkyl groups, $C_1$–$C_{12}$ alkoxy groups, silyloxy groups $OSiR^{11}R^{12}R^{13}$, amino groups $NR^{14}R^{15}$ or $C_1$–$C_{12}$ thioether groups as defined above, $C_1$–$C_{12}$ alkoxy as defined above, silyloxy groups $OSiR^{11}R^{12}R^{13}$ as defined above, halogens as defined above, $NO_2$ groups or amino groups $NR^{14}R^{15}$ as defined above, wherein two neighboring substituents in $R^4$ to $R^7$ in each case together with the C atoms of the parent substance can form a 5- to 8-membered saturated or unsaturated aliphatic or aromatic ring as defined above.

$R^8$ and $R^9$ independently of one another stand for:

hydrogen, $C_1$–$C_6$ alkyl as defined above, $C_7$–$C_{13}$ aralkyl as defined above or $C_6$–$C_{14}$ aryl optionally substituted by one or more $C_1$–$C_{12}$ alkyl groups, halogens, singly or multiply halogenated $C_1$–$C_{12}$ alkyl groups, $C_1$–$C_{12}$ alkoxy groups, silyloxy groups $OSiR^{11}R^{12}R^{13}$, amino groups $NR^{14}R^{15}$ or $C_1$–$C_{12}$ thioether groups as defined above in each case.

$R^{10}$ to $R^{15}$ independently of one another stand for:

hydrogen, $C_1$–$C_{20}$ alkyl groups such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-octyl, n-nonyl, isononyl, n-decyl, isodecyl, n-undecyl, isoundecyl, n-dodecyl, isododecyl, n-tetradecyl, n-hexadecyl, n-octadecyl and n-icosyl; by particular preference $C_1$–$C_4$ alkyl such as methyl, ethyl, n-propyl, isopropyl, n-butyl, isobutyl, sec-butyl and tert-butyl, $C_1$–$C_{20}$ alkyl groups substituted by $O(C_1$–$C_6$ alkyl) or $N(C_1$–$C_6$ alkyl)$_2$ substituents such as by way of example $CH_2$—$CH_2$—$OCH_3$ or $CH_2$—$CH_2$—$N(CH_3)_2$, $C_3$–$C_{12}$ cycloalkyl as defined above, $C_7$–$C_{13}$ aralkyl substituents as defined above, $C_6$–$C_{14}$ aryl groups as defined above, wherein two neighboring substituents in $R^{10}$ to $R^{15}$ in each case together with the hetero atom in question can form a saturated or unsaturated aliphatic or aromatic 5- to 8-membered ring.

$R^{16}$ are the same or different and stand for:

hydrogen, $C_1$–$C_{20}$ alkyl groups as defined above, $C_1$–$C_{20}$ alkyl groups substituted by $O(C_1$–$C_6$ alkyl) or $N(C_1$–$C_6$ alkyl)$_2$ substituents as defined above, $C_3$–$C_{12}$ cycloalkyl as defined above, $C_7$–$C_{13}$ aralkyl substituents as defined above, $C_6$–$C_{14}$ aryl groups as defined above.

The synthesis of the complexes of the general formula Ia and Ib is inherently known. Complexes of formula Ia are synthesized by analogy with the precepts in specifications EP-A 46331, EP-A 46328 and EP-A 52929. Complexes of formula Ib are synthesized by analogy with the precepts in specifications WO 98/30609 and WO 98/42664 and in the publication by C. Wang et al., Organo-metallics 1998, 17, pages 3149 et seq. In the nomenclature of the compounds of the general formula Ib the nomenclature according to WO 98/42664 is used.

The complex compounds Ia and Ib may be employed singly or in a mixture. If the complexes are employed in a mixture the ratio of the two complexes to one another can be freely chosen, the molar ratio of complex Ia to Ib frequently being $\leq 10:\geq 90$, $\leq 20:\geq 80$, $\leq 30:\geq 70$, $\leq 40:\geq 60$, $\leq 50:\geq 50$, $\leq 60:\geq 40$, $\leq 70:\geq 30$, $\leq 80:\geq 20$, $\leq 90:\geq 10$ and all values in between.

Preferably, electrically neutral complex compounds of nickel are employed.

The total quantity of complex compound a1) used is generally in the range of $10^{-6}$ to $10^{-2}$ mol/l, frequently $10^{-5}$ to $10^{-3}$ mol/l and often $10^{-5}$ to $10^{-4}$ mol/l, with reference in each case to the total quantity made up of water, olefinically unsaturated compounds and any organic solvents c).

Metal complexes a1) which can be employed with particular advantage are those whose ligands are derived from the derivatives of salicylaldimine. Particularly preferred are

[Ni (phenyl) (pyridine) ($K^2N,O$ (2-O-phenyl)—CH=N—(2,6-diisopropyl)phenyl] (IIa),

[Ni (phenyl) (triphenylphosphane) ($K^2N,O$ (2-O-phenyl)—CH=N—(2,6-diisopropyl)phenyl] (IIb),

[Ni (methyl) (acetonitrile) ($K^2N,O$ (2-O-phenyl)—CH=N—(2,6-diisopropyl)phenyl] (IIc),

[Ni (methyl) (pyridine) ($K^2N,O$ (2-O-phenyl)—CH=N—(2,6-diisopropyl)phenyl] (IId),

[Ni (phenyl) (pyridine) ($\kappa^2$N,O (2-O-(3,5-diiodo)-phenyl)—CH=N—(2,6-diisopropyl)phenyl] (IIIa),

[Ni (phenyl) (triphenylphosphane) ($\kappa^2$N,O (2-O-(3,5-diiodo)-phenyl)—CH=N—(2,6-diisopropyl)phenyl] (IIIb),

[Ni (methyl) (acetonitrile) ($\kappa^2$N,O (2-O-(3,5-diiodo)-phenyl)—CH=N—(2,6-diisopropyl)phenyl] (IIIc),

[Ni (phenyl) (pyridine) ($\kappa^2$N,O (2-O-(3,5-diiodo) phenyl)—CH=N—(2,6-diisopropyl)phenyl] (IIId),

[Ni (phenyl) (pyridine) ($\kappa^2$N,O (2-O-phenyl)—C(trifluoromethyl)=N—(2,6-diisopropyl)phenyl] (IVa),

[Ni (phenyl) (triphenylphosphane) ($\kappa^2$N,O (2-O-phenyl)—C(trifluoromethyl)=N—(2,6-diisopropyl phenyl] (IVb),

[Ni (methyl) (acetonitrile) ($\kappa^2$N,O (2-O-phenyl)—C(trifluoromethyl)=N—(2,6-diisopropyl)phenyl] (IVc),

[Ni (methyl) (pyridine) ($\kappa^2$N,O (2-O-phenyl)—C(trifluoromethyl)=N—(2,6-diisopropyl)phenyl] (IVd).

In a preferred process the aforesaid metal complexes al) are used in combination with an activator a2). According to common conception the activator a2) abstracts the ligand $L^1$ from the metal complexes a1). The activators a2) can in particular be olefin complexes of rhodium or nickel.

Preferred, commercially available activators a2) are nickel-(olefin)$_y$ complexes such as Ni(C$_2$H$_4$)$_3$, Ni(1,5-cyclooctadiene)$_2$ "Ni(COD)$_2$", Ni(1,6-cyclodecadiene)$_2$ or Ni(1,5,9-all-trans-cyclododecatriene)$_2$. Ni(COD)$_2$ is particularly preferred.

Mixed ethylene/1,3-dicarbonyl complexes of rhodium, such as by way of example rhodium acetylacetonato-ethylene Rh (acac) (CH$_2$=CH$_2$)$_2$, rhodium benzoylacetonato-ethylene Rh (C$_6$H$_5$—CO—CH—CO—CH$_3$) (CH$_2$=CH$_2$)$_2$ or Rh(C$_6$H$_5$—CO—CH—CO—C$_6$H$_5$) (CH$_2$=CH$_2$)$_2$ table. Rh(acac) (CH$_2$=CH$_2$)$_2$ is highly suitable. This compound can be synthesized by the method of R. Cramer in *Inorg. Synth.* 1974, 15, pages 14 et seq.

The molar ratio of activator a2) to metal complex a1) is usually in the range of 0.1 to 10, frequently 0.2 to 5 and often 0.5 to 2.

The dispersing agents b) used in the method according to the invention may be emulsifiers or protective colloids.

Suitable protective colloids are by way of example poly (vinyl alcohols), polyalkylene glycols, alkali metal salts of polyacrylic acids and polymethacrylic acids, gelatin derivatives or copolymers containing acrylic acid, methacrylic acid, maleic anhydride, 2-acrylamido-2-methylpropanesulfonic acid and/or 4-styrenesulfonic acid and their alkali metal salts and also N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, and acrylates, methacrylates, acrylamides bearing amine groups and/or homopolymers and copolymers containing methacrylamides. An extensive description of further suitable protective colloids is presented in Houben-Weyl, Methoden der organischen Chemie [Methods of organic chemistry], Volume XIV/1, Makromolekulare Stoffe [Macromolecular substances], Georg-Thieme-Verlag, Stuttgart, 1961, pages 411 to 420.

Of course mixtures of protective colloids and/or emulsifiers may also be employed. Frequently emulsifiers, whose relative molecular weights in contrast with the protective colloids are usually less than 1,000, are used exclusively as dispersing agents. They can be anionic, cationic or nonionic in nature. Of course when mixtures of surface-active substances are used the individual components must be compatible with one another, it being possible to check this in case of doubt on the basis of a few preliminary tests. In general, anionic emulsifiers are compatible with one another and with nonionic emulsifiers. The same also applies to cationic emulsifiers, while anionic and cationic emulsifiers are mostly not compatible with one another. An overview of suitable emulsifiers may be found in Houben-Weyl, Methoden der organischen Chemie, Volume XIV/1, Makromolekulare Stoffe, Georg-Thieme-Verlag, Stuttgart, 1961, pages 192 to 208.

According to the invention anionic, cationic and/or nonionic emulsifiers in particular are used as dispersing agents b), and preferably anionic and/or nonionic emulsifiers.

Commonly used nonionic emulsifiers are, for example, ethoxylated mono-, di- and tri-alkylphenols (degree of ethoxylation: 3 to 50, alkyl substituent: C$_4$ to C$_{12}$) and ethoxylated fatty alcohols (degree of ethoxylation: 3 to 80; alkyl substituent: C$_8$ to C$_{36}$). Examples of these are the Lutensol® A grades (C$_{12}$C$_{14}$ fatty alcohol ethoxylates, degree of ethoxylation: 3 to 30), Lutensol® AO grades (C$_{13}$C$_{15}$ oxoalcohol ethoxylates, degree of ethoxylation: 3 to 30), Lutensol® AT grades (C$_{16}$C$_{18}$ fatty alcohol ethoxylates, degree of ethoxylation: 11 to 80), Lutensol® ON grades (C$_{10}$ oxoalcohol ethoxylates, degree of ethoxylation: 3to 11) and the Lutensol® TO grades (C$_{13}$ oxoalcohol ethoxylates, degree of ethoxylation: 3 to 20) from BASF AG.

Customary anionic emulsifiers are, for example, alkali metal and ammonium salts of alkyl sulfates (alkyl substituent: C$_8$ to C$_{12}$), of sulfate semiesters of ethoxylated alkanols (degree of ethoxylation: 4 to 30, alkyl substituent: C$_{12}$ to C$_{18}$) and ethoxylated alkylphenols (degree of ethoxylation: 3 to 50, alkyl substituent: C$_4$ to C$_{12}$), of alkylsulfonic acids (alkyl substituent: C$_{12}$ to C$_{18}$) and of alkylarylsulfonic acids (alkyl substituent: C$_9$ to C$_{18}$).

Furthermore, compounds which have proved useful as additional anionic emulsifiers have the general formula V

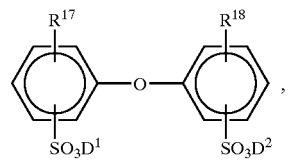

V in which R$^{17}$ and R$^{18}$ stand for H atoms or C$_4$ to C$_{24}$ alkyl groups but not H atoms simultaneously, and D$^1$ and D$^2$ can be alkali metal ions and/or ammonium ions. In the general formula V R$^{17}$ and R$^{18}$ preferably stand for linear or branched alkyl substituents having 6 to 18 C atoms, in particular having 6, 12 and 16 C atoms or hydrogen, R$^{17}$ and R$^{18}$ not both being H atoms at the same time. D$^1$ and D$^2$ are preferably sodium, potassium or ammonium, sodium being particularly preferred. Particularly advantageous are compounds V in which D$^1$ and D$^2$ are sodium, R$^{17}$ is a branched alkyl substituent having 12 C atoms and R$^{18}$ is a H atom or R$^{17}$. Frequently industrial mixtures are used which have a proportion of 50 to 90 wt. % of the monoalkylated product such as by way of example Dowfax® 2A1 (brand name of the Dow Chemical Company). The compounds V are generally known, for example from U.S. Pat. No. 4,269,749, and are commercially available.

Suitable cationic emulsifiers are primary, secondary, tertiary or quaternary ammonium salts, alkanolammonium salts, pyridinium salts, imidazolinium salts, oxazolinium salts, morpholinium salts, thiazolinium salts and salts of amine oxides, quinolinium salts, isoquinolinium salts, tropylium salts, sulfonium salts and phosphonium salts exhibiting as a rule a $C_6$ to $C_{18}$ alkyl, alkylaryl or heterocyclic substituent. Examples which may be mentioned are dodecylammonium acetate or the corresponding sulfate, the sulfates or acetates of the different 2-(N,N,N-trimethylammonium)ethylparaffinic acid esters, N-cetylpyridinium sulfate, N-laurylpyridinium sulfate and N-cetyl-N,N,N-trimethylammonium sulfate, N-dodecyl-N,N,N-trimethylammonium sulfate, N-octyl-N,N,N-trimethlyammonium sulfate, N,N-distearyl-N,N-dimethylammonium sulfate together with the twin surfactant N,N'-(lauryldimethyl)ethylenediamine disulfate, ethoxylated tallow fat alkyl N-methylammonium sulfate and ethoxylated oleylamine (for example Uniperol® AC from BASF AG with approx. 12 ethylene oxide units). Numerous other examples may be found in H. Stache, Tensid-Taschenbuch (Surfactants handbook), Carl-Hanser-Verlag, Munich, Vienna, 1981 and in McCutcheon's Emulsifiers & Detergents, MC Publishing Company, Glen Rock, 1989. The key point is that the anionic balancing groups have the lowest possible nucleophilic activity such as by way of example perchlorate, sulfate, phosphate, nitrate and carboxylates such as acetate, trifluoroacetate, trichloroacetate, propionate, oxalate, citrate and benzoate, together with conjugated anions of organosulfonic acids such as for example methylsulfonate, trifluoromethylsulfonate and para-toluenesulfonate and also tetrafluoroborate, tetraphenylborate, tetrakis(pentafluorophenyl)borate, tetrakis[bis(3,5-trifluoromethyl)phenyl]borate, hexafluorophosphate, hexafluoroarsenate or hexafluoroantimonate.

The emulsifiers preferably employed as dispersing agents b) are advantageously used in a total quantity of 0.005 to 10 parts by weight, preferably 0.01 to 7 parts by weight, in particular 0.1 to 5 parts by weight with reference in each case to 100 parts by weight of water. Depending on the polymerization system it is also possible to select the quantity of emulsifiers in such a way that their critical micelle formation concentration in water is not exceeded.

The total quantity of protective colloids employed additionally or alternatively as dispersing agents b) often amounts to 0.1 to parts by weight and frequently 0.2 to 7 parts by weight with reference in each case to 100 parts by weight of water.

According to the invention organic solvents c) having low solubility in water can also optionally be used. Suitable solvents c) are liquid aliphatic and aromatic hydrocarbons containing 5 to 30 C atoms, such as by way of example n-pentane and isomers, cyclopentane, n-hexane and isomers, cyclohexane, n-heptane and isomers, n-octane and isomers, n-nonane and isomers, n-decane and isomers, n-dodecane and isomers, n-tetradecane and isomers, n-hexadecane and isomers, n-octadecane and isomers, icosane, benzene, toluene, ethylbenzene, cumene, o-, m- or p-xylene, mesitylene and mixtures of hydrocarbons in general boiling in the range of 30 to 250° C. It is also possible to use hydroxy compounds such as saturated and unsaturated fatty alcohols having 10 to 28 C atoms, for example n-dodecanol, n-tetradecanol, n-hexadecanol and their isomers or cetyl alcohol, esters, such as by way of example fatty acid esters having 10 to 28 C atoms in the acid moiety and 1 to 10 C atoms in the alcohol moiety or esters of carboxylic acids and fatty alcohols having 1 to 10 C atoms in the carboxylic acid moiety and 10 to 28 C atoms in the alcohol moiety. It is of course also possible to employ mixtures of the aforesaid solvents.

The total quantity of solvent amounts to up to 15 parts by weight, preferably 0.001 to 10 parts by weight and by particular preference 0.01 to 5 parts by weight with reference in each case to 100 parts by weight of water.

It is advantageous for the solubility of the solvent c) or the mixture of solvents under reaction conditions in the aqueous reaction medium to be as far as possible $\leq 50$ wt. %, $\leq 40$ wt. %, $\leq 30$ wt. %, $\leq 20$ wt. % or $\leq 10$ wt. % with reference in each case to the total quantity of solvent.

Solvents c) are used in particular when the olefinically unsaturated compounds are gaseous under reaction conditions (pressure/temperature), as is the case for example for ethene, propene, 1-butene and/or isobutene.

It is essential to the invention that the total amount of metal complexes a1) including any activators a2) used with them is dissolved in a partial quantity or the total amount of the olefinically unsaturated compounds and/or of the organic solvents c) having low solubility in water. Subsequently, the partial quantity or the total amount of the olefinically unsaturated compounds and/or of the organic solvents c) having low solubility in water which holds the metal complexes a1) in solution is dispersed as disperse phase in the presence of dispersing agents b) to an average droplet diameter of $\leq 1,000$ nm in aqueous medium and at reaction temperature any remaining residual quantities of the olefinically unsaturated compounds and/or the organic solvents c) having low solubility in water are added continuously or discontinuously.

The process according to the invention is carried out as a rule in such a way that in a first step the total quantity of the metal complexes a1) together with the activators a2) optionally used are dissolved in a partial quantity or the total amount of the olefinically unsaturated compounds and/or the organic solvents c) having low solubility in water. This solution together with the dispersing agents b) is then dispersed in aqueous medium with formation of oil-in-water dispersions having an average droplet diameter of >1,000 nm, what are known as the macroemulsions. After that these macroemulsions are converted by known measures into oil-in-water emulsions having an average droplet diameter of $\leq 1,000$ nm, what are known as the miniemulsions and these are mixed at reaction temperature with the optionally remaining or total quantity of the olefinically unsaturated compounds and/or of the organic solvents c) having low solubility in water.

The average size of the droplets in the disperse phase of the aqueous oil-in-water emulsions to be used according to the invention can be determined by the principle of quasielastic dynamic light scattering (referred to as the z-average droplet diameter $d_z$ of the unimodal analysis of the autocorrelation function) using, for example, a Coulter N4 Plus Particle Analyser from Coulter Scientific Instruments. The measurements are carried out at 25° C. and atmospheric pressure on dilute aqueous miniemulsions whose nonaqueous constituents content is 0.01 wt. %. Dilution in this case is done by means of water which had previously been saturated with the olefinically unsaturated compounds and/ or the organic solvents c) having low solubility in water present in the aqueous emulsion. The latter measure is intended to prevent dilution being accompanied by a change in droplet diameter.

According to the invention the values for $d_z$ determined for the so-called miniemulsions are normally $\leq 700$ nm and frequently $\leq 500$ nm. According to the invention the $d_z$ range of 100 nm to 400 nm or of 100 nm to 300 nm is advantageous. In the normal case, $d_z$ for the aqueous miniemulsions to be employed according to the invention is $\geq 40$ nm.

The general preparation of aqueous miniemulsions from aqueous macroemulsions is known to the person skilled in the art (cf. P. L. Tang, E. D. Sudol, C. A. SilebIand M. S. El-Aasser in Journal of Applied Polymer Science, Vol. 43, pages 1059 to 1066 [1991]).

High-pressure homogenizers, for example, can be used for this purpose. The fine division of the components in these machines is achieved by high local energy input. In this respect two variants have proved to be particularly effective.

In the first variant the aqueous macroemulsion is compressed to over 1,000 bar by a piston pump and then decompressed through a narrow gap. The effect here is based on the interplay of high shear and pressure gradients and cavitation in the gap. An example of a high-pressure homogenizer which operates in accordance with this principle is the Niro-Soavi high-pressure homogenizer, model NS1001L Panda.

In the second variant the compressed aqueous macroemulsion is decompressed into a mixing chamber via two nozzles directed against one another. The fine division effect here is primarily dependent on the hydrodynamic conditions in the mixing chamber. An example of this type of homogenizer is the model M 120 E microfluidizer from the Microfluidics Corp. In this high-pressure homogenizer the aqueous macroemulsion is compressed to pressures of up to 1,200 bar by means of a pneumatically operated piston pump and decompressed via what is known as an "interaction chamber". In the interaction chamber the jet of emulsion is split in a microchannel system into two jets which are conveyed towards one another at an angle of 180°. A further example of a homogenizer operating by this type of homogenization is the Nanojet Expo model from Nanojet Engineering GmbH. However, in the Nanojet instead of a fixed channel system two homogenizing valves are installed which can be mechanically adjusted.

Apart from the principles explained above homogenization can also be carried out by the application of ultrasound for example (e.g. Branson Sonifier II 450). The fine division is based in this case on cavitation mechanisms. The devices described in GB-A 22 50 930 and U.S. Pat. No. 5,108,654 are also suitable in principle for homogenization by means of ultrasound. In these cases the quality of the aqueous miniemulsion produced in the sound field depends not only on the sonic power introduced but also on other factors such as the intensity distribution of the ultrasound in the mixing chamber, the residence time, the temperature and the physical properties of the substances to be emulsified, for example their viscosity, surface tension and vapor pressure. At the same time the resultant droplet size depends, inter alia, on the concentration of the emulsifier and on the energy introduced during homogenization and can, therefore, be selectively adjusted for example by an appropriate change in homogenization pressure or the corresponding ultrasound energy.

The device described in the earlier German patent application DE 197 56 874 has proved to be particularly effective for the production of the aqueous miniemulsions used according to the invention from conventional macroemulsions by means of ultrasound. This is a device which possesses a reaction chamber or a flow reaction channel and at least one means for transmitting ultrasonic waves onto the reaction chamber or flow reaction channel, the means for transmitting ultrasonic waves being designed in such a way that the entire reaction chamber or a partial section of the flow reaction channel can be uniformly irradiated with ultrasonic waves. For this purpose the radiation emitting surface of the means for transmitting ultrasonic waves is formed in such a way that it substantially coincides with the surface of the reaction chamber or, when the reaction chamber is a partial section of a flow reaction channel, extends substantially over the entire width of the channel, and that the depth of the reaction chamber substantially perpendicular to the emitting surface is less than the maximum depth of action of the ultrasound transmission means.

The "depth of the reaction chamber" is to be understood here as substantially the distance between the emitting surface of the ultrasound transmission means and the bottom of the reaction chamber.

Reaction chambers are preferably up to 100 mm in depth. Advantageously the depth of the reaction chamber should not be more than 70 mm and particularly advantageously not more than 50 mm. In principle the reaction chambers can also have a very small depth but in order to reduce the risk of blockage as much as possible and to facilitate cleaning as well as throughput of product, reaction chamber depths are preferred which are substantially greater, for example, than the usual gap heights in high-pressure homogenizers and are usually over 10 mm. The depth of the reaction chamber is advantageously variable, for example by means of ultrasound transmission means dipping into the housing to different depths.

According to a first embodiment of this device the emitting surface of the means for the transmission of ultrasound substantially coincides with the surface of the reaction chamber. This embodiment serves for the batchwise production of the miniemulsions employed according to the invention. Using this device ultrasound can act on the entire reaction chamber. In the reaction chamber due to the axial sound radiation pressure turbulent flow is produced which brings about intimate cross mixing.

According to a second embodiment such a device possesses a flow cell. At the same time the housing is constructed in the form of a flow reaction channel which has an inflow and an outflow, the reaction chamber being a partial section of the flow reaction channel. The width of the channel is the channel extension extending substantially perpendicular to the direction of flow. Here the emitting surface covers the entire width of the flow channel transverse to the direction of flow. The length of the emitting surface perpendicular to this width, that is the length of the emitting surface in the direction of flow, defines the region of action of the ultrasound. According to an advantageous variant of this first embodiment the flow reaction channel has a substantially rectangular cross section. If a likewise rectangular ultrasound transmission means having corresponding dimensions is built into a side of the rectangle particularly effective and uniform acoustic irradiation is ensured. Due to the turbulent flow conditions prevailing in the ultrasound field it is also possible, however, to employ a round transmission means, for example, without disadvantage. Moreover, instead of a single ultrasound transmission means several separate transmission means can be provided which viewed in the direction of flow are connected one behind the other. At the same time both the emitting surfaces as well as the depth of the reaction chamber, that is the distance between the emitting surface and the bottom of the flow channel, can vary.

Particularly advantageously, the means for transmitting ultrasonic waves is constructed in the form of a sonotrode whose end facing away from the free emitting surface is coupled to an ultrasound transducer. The ultrasonic waves can be generated, for example, by exploiting the reverse piezoelectric effect. In doing so high-frequency electric oscillations (usually in the range of 10 to 100 kHz and preferably between 20 and 40 kHz) are generated with the aid of generators, converted via a piezoelectric transducer into mechanical oscillations of the same frequency and input into the medium to be acoustically irradiated by the sonotrode as transmission element.

By particular preference the sonotrode is constructed as a rod-shaped, axially emitting λ/2 (or multiples of λ/2) longitudinal oscillator. Such a sonotrode can be fastened by way of example by means of a flange provided at one of its oscillation nodes in an opening of the housing. In this way the passage of the sonotrode into the housing can be made pressure-tight so that the acoustic irradiation can also be carried out in the reaction chamber under elevated pressure. Preferably the amplitude of oscillation of the sonotrode is controllable, that is to say the amplitude of oscillation set at any time is checked on-line and if need be automatically readjusted. The current amplitude of oscillation can be checked, for example, by a piezoelectric transducer fitted on the sonotrode or by a strain gauge with downstream evaluation electronics.

According to a further advantageous development of such devices internal fittings are provided in the reaction chamber to improve flow and mixing characteristics. These internal fittings can, for example, be simple baffle plates or extremely diverse porous bodies.

Moreover, the mixing can be further intensified if necessary by an additional agitator. Advantageously, the temperature in the reaction chamber can be controlled.

From the above statements it is clear that according to the invention only those organic solvents c) or mixtures of solvents can be used whose solubility in aqueous medium under reaction conditions is low enough in order with the specified quantities to form solvent droplets ≦1,000 nm as a separate phase. Over and above this, the solvent power of the solvent droplets formed must be high enough to take up the metal complexes a1) and any activators a2) employed. The same applies also to the olefins when these are employed without organic solvents c) as well as for mixtures of olefins and organic solvents c).

An embodiment of the process according to the invention takes such a form, for example, that the total quantities of the metal complex a1) and any activators a2) optionally added are dissolved in a partial quantity or the total amount of organic solvents c) having poor solubility in water. This organic metal complex solution together with a portion or the total amount of the dispersing agent b) is then dispersed in water with formation of a macroemulsion. Using one of the aforesaid homogenizing devices the macroemulsion is converted into a miniemulsion. Into this at reaction temperature and with constant stirring are metered in the total quantity of olefinically unsaturated compounds together optionally with any remaining residual quantities of organic solvents c) or dispersing agents b). This process variant is chosen in particular when the olefins used are gaseous under reaction conditions as is the case, for example, for ethene, propene, 1-butene and/or isobutene.

In a further embodiment the total quantity of metal complex a1) and any activators a2) optionally added are dissolved in a portion or the total quantity of olefinically unsaturated compounds. This organic metal complex solution together with a portion or the total quantity of the dispersing agents b) is then dispersed in water with formation of a macroemulsion. Using one of the aforesaid homogenizing devices the macroemulsion is converted into a miniemulsion. Into this miniemulsion at reaction temperature and with constant stirring are metered in any remaining residual quantities of olefinically unsaturated compounds or dispersing agents b) as well as optionally the total amount of organic solvents c) having low solubility in water. This process variant is used in particular when the olefinically unsaturated compounds used are liquid under reaction conditions as is the case, for example, for 1-pentene, cyclopentene, 1-hexene, cyclohexene, 1-octene, 1-decene, 1-dodecene, 1-tetradecene and/or 1-hexadecene.

Essential to the process is that the metal complexes a1) are dissolved in at least a partial quantity of the olefinically unsaturated compounds and/or of the organic solvents c) having low solubility in water and this solution is present in aqueous medium under reaction conditions as a separate phase having an average droplet size of ≦1,000 nm. The residual quantities of olefinically unsaturated compounds and/or of the organic solvents c) having low solubility in water optionally remaining may be added to the aqueous reaction medium in substance, in solution or together with any remaining residual quantities of dispersing agent b) also in the form of an aqueous macroemulsion. If solvents c) are used the total quantity of solvents is frequently used to dissolve the metal complexes a1) and then dispersed in aqueous medium.

It is important that the liquid droplets present as a separate phase in the aqueous medium and having a diameter of ≦1,000 nm can contain yet other components in addition to the aforesaid compounds a1), a2) and c) and the olefinically unsaturated compounds. Other components which come into consideration are, for example, formulation aids, antioxidants, light stabilizers and also dyestuffs, pigments and/or waxes for imparting water repellency. If the solubility of the further components in the organic phase forming the droplets is greater than in the aqueous medium these remain in the droplets during the polymerization reaction. Since the droplets composed of olefinically unsaturated compounds and/or solvents c) having low solubility in water contain the metal complexes a1) and in the final analysis are the loci of polymerization, the particles of polymer formed usually contain these additional components in integrally polymerized form.

The actual polymerization usually proceeds at a minimum pressure of 1 bar, the rate of polymerization below this pressure being too low. A pressure of 2 bar is preferred and a minimum pressure of 10 bar is particularly preferred.

4,000 bar may be identified as the maximum pressure; at higher pressures the requirements on the material of the polymerization reactor are very high and the process becomes uneconomic. Pressures ≦100 bar are preferred and ≦50 bar are particularly preferred.

The polymerization temperature can be varied over a wide range. The minimum temperature may be identified as 10° C. since at low temperatures the rate of polymerization declines. A minimum temperature of 20° C. is preferred and one of 30° C. is particularly preferred. The maximum useful temperature may be identified as 350° C., preferably 150° C. and by particular preference 100° C.

The number average particle diameters of the polymer particles in the dispersions according to the invention are between 10 and 1,000 nm, preferably between 50 and 500 nm and by particular preference between 70 and 350 nm (quasielastic light scattering; ISO standard 13321). The distribution of the particle diameters is narrow and monomodal as a rule.

The particle diameters can be determined by customary methods. An overview of these methods may be found, for example, in D. Distler (editor) "WäBrige Polymerdispersionen [Aqueous polymer dispersions]", Wiley-VCH Verlag, $1^{st}$ edition, 1999, chapter 4.

The weight average molecular weights $M_w$ of the polymers obtained according to the invention determined by means of gel permeation chromatography using poly(methyl methacrylate) as standard lie as a rule in the range of 10,000 to 10,000,000, frequently in the range of 15,000 to 1,000,000 and often in the range of 20,000 to 1,000,000. The molecular weight distribution D (where $D=M_w/M_n$) is usually narrow with D values of $\leq 4$, $\leq 3$, and also $\leq 2.5$ or even $\leq 2$.

By selective variation of the olefinically unsaturated compounds it is possible according to the invention to produce copolymers whose glass transition temperature or melting point lies in the range of −60 to +270° C.

By the glass transition temperature $T_g$ is meant the threshold value of the glass transition temperature which the latter approaches according to G. Kanig (Kolloid-Zeitschrift & Zeitschrift für Polymere [Colloid journal and Journal for polymers], Vol. 190, page 1, equation 1) with increasing molecular weight. The glass transition temperature is measured by the DSC method (differential scanning calorimetry, 20 K/min, midpoint measurement, DIN 53765).

According to Fox (T. G. Fox, Bull. Am. Phys. Soc. 1956 [Ser. II] 1, page 123 and according to Ullmann's Encyclopädie der technischen Chemie [Encyclopedia of industrial chemistry], Vol. 19, page 18, $4^{th}$ edition, Verlag Chemie, Weinheim, 1980) a good approximation for the glass transition temperature of at most weakly cross-linked mixed polymers is given by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures of the polymers each built up of only one of the monomers 1, 2, ... n in degrees Kelvin. The $T_g$ values for the homopolymers of most monomers are known and listed, for example, in Ullmann's Encyclopedia of Industrial Chemistry, Bk. 5, Vol. A21, page 169, VCH Weinheim, 1992; further sources of glass transition temperatures of homopolymers are, for example, J. Brandrup, E. H. Immergut, Polymer Handbook, $1^{st}$ Ed., J. Wiley, New York 1966, $2^{nd}$ Ed. J. Wiley, New York 1975, and $3^{rd}$ Ed. J. Wiley, New York 1989.

The polymer dispersions according to the invention frequently exhibit minimum film-forming temperatures MFT of $\leq 80°$ C., often $\leq 50°$ C. or $\leq 30°$ C. Since MFTs below 0° C. are no longer measurable, the lower limit of the MFT can only be given by the $T_g$ values. The MFT is determined by DIN 53787.

By means of the process according to the invention aqueous copolymer dispersions are obtainable whose solids content is 0.1 to 70 wt. %, frequently 1 to 65 wt. % and often 5 to 60 wt. % and all values in between.

Of course the residual monomers remaining in the aqueous polymer system after completion of the main polymerization reaction can be removed by steam or inert-gas stripping familiar to the person skilled in the art, without detrimental change to the polymer properties of the polymers present in the aqueous medium.

The aqueous polymer dispersions obtainable according to the invention are frequently stable over several weeks or months and during this time exhibit as a rule practically no phase separation, settling or coagulate formation whatsoever.

The aqueous polymer dispersions obtainable according to the invention may be used to advantage in numerous applications such as by way of example paper applications like paper coating or surface sizing, and in surface coatings and paints, building chemicals and plastic plasters, adhesives raw materials, sealing compounds, molded foams, textile and leather applications, carpet backings, mattresses or pharmaceutical preparations.

Paper coating is understood as the coating of the paper surface with aqueous pigmented dispersions. In doing this the polymer dispersions according to the invention are advantageous owing to their favorable price. Surface sizing means the pigment-free application of substances imparting water repellency. In this case specifically the polyolefin dispersions available only with difficulty to date under economic conditions are advantageous as particularly hydrophobic substances. It is, furthermore, advantageous that during the production of dispersions according to the invention for paper coating or surface sizing no molecular weight controllers, such as tert-dodecyl mercaptans for example, need be added which, on the one hand, are difficult to separate and, on the other hand, have an unpleasant odor.

In surface coatings and paints the polymer dispersions available according to the invention are particularly suitable because they are very favorable in price. Aqueous polyethylene dispersions are particularly advantageous because they also exhibit particular stability to UV. Aqueous polyethylene dispersions are further particularly suitable because they are resistant to basic materials, such as cement for example, which are commonly found among building chemicals.

In adhesives, in particular in adhesives for pressure-sensitive labels or films and plasters, and also in building adhesives or industrial adhesives the dispersions according to the invention have economic advantages. They are particularly advantageous especially in building adhesives because they are resistant to basic materials common among building chemicals.

In molded foams, which are produced from the dispersions according to the invention by inherently known methods such as the Dunlop process or the Talalay process, the favorable price of the dispersions according to the invention is once again advantageous. Further components used are gelling agents, soaps, thickeners and vulcanizing pastes. Molded foams are processed to mattresses for example.

Textile and leather applications are used for preserving and finishing textiles and leather. Among the effects which may be mentioned by way of example are the impregnation and the further treatment of textiles. Apart from the attractive price an advantage in the dispersions according to the invention as a component in textile and leather applications is their freedom from odor since olefins as residual monomers can be readily removed.

Carpet backings serve to bond the carpet fibers at the back and they also have the task of lending the carpet the necessary stiffness and of uniformly distributing additives such as flame-proofing agents and antistatics. Apart from their attractive price an advantage of the dispersions according to the invention is their lack of sensitivity to common additives. In particular, the polyethylene dispersions according to the invention have proved to be particularly chemically inert. It is, furthermore, advantageous that during the production of the dispersions according to the invention for carpet backings no molecular weight controllers, such as tert-dodecyl mercaptans for example, need be added which, on the one hand, are difficult to separate and, on the other hand, have an unpleasant odor. Finally, carpets containing the carpet backings according to the invention can be readily recycled.

Pharmaceutical formulations are understood to be dispersions as carriers of medicinal preparations. Dispersions as carriers of medicines are inherently known. Advantages of the dispersions according to the invention as carriers of medicinal preparations are their economically attractive price and their resistance to bodily factors such as gastric juices or enzymes.

The process according to the invention opens up an economically and ecologically simple preparative pathway, which is generally recognized as safe, to aqueous polymer dispersions from low-cost olefins. Due to the method of their production the aqueous polymer dispersions obtainable according to the invention possess polymer particles which contain no or just the very smallest quantities of organic solvents. However, if the process according to the invention is carried out in the presence of solvents c) having low solubility in water it is possible to prevent odor nuisance in the formation of polymer films by selecting high-boiling solvents c). On the other hand, the optionally used solvents c) frequently act as coalescing agents and hence promote film formation. Because of the nature of the process the polymer dispersions obtainable according to the invention possess polymer particles having a narrow, monomodal particle size distribution. Moreover, even when the amounts of dispersing agents are small the aqueous polymer dispersions obtained are stable for weeks and months and during this time exhibit as a rule practically no phase separation, settling or coagulate formation whatsoever. Furthermore, by the process according to the invention aqueous polymer dispersions are also obtainable whose polymer particles contain in addition to the polymer further additives such as by way of example formulation aids, antioxidants, light stabilizers and also dyes, pigments and/or waxes.

EXAMPLES

The synthesis of the complex used according to the invention, [Ni (methyl) (pyridine) ($\kappa^2$N,O (2-O-phenyl)—CH=N—(2,6-diisopropyl)phenyl] (IId), may be found in F. M. Bauers, S. Mecking, Macromolecules 2001, 34, pages 1165 to 1171, while the synthesis of the comparative complex used Na$^+$[Ni (phenyl) (triphenylphosphane) ($\kappa^2$P,O (diphenylphosphino)C(SO$_3^-$)=C(—O) (4-methylphenyl)] is described in WO 01/44325.

Example 1

16 mg of complex IId were dissolved at 20 to 25° C. (room temperature) under an atmosphere of argon in 5 ml of toluene ($\geq$99.8 wt. %, Aldrich-Chemie) und 1 ml of n-hexadecane ($\geq$99 wt. %, Aldrich-Chemie) while stirring. After this, at room temperature under an atmosphere of argon the organic solution obtained is stirred into an aqueous solution consisting of 100 ml of degassed and deionized water and 0.5 g of sodium dodecylsulfate ($\geq$98 wt. %, Aldrich-Chemie) with formation of an emulsion. By treatment with an ultrasonic head (sandelin HD 2200 with KE76 head, 120 watts, for 10 minutes) an oil-in-water emulsion was obtained whose average droplet size determined by the principle of quasielastic dynamic light scattering amounted to 200 nm. This oil-in-water emulsion was then sucked by means of partial vacuum into a 250 ml steel autoclave. This was then pressurized at 30° C. while stirring (500 s$^{-1}$, mechanical stirrer) with 45 bar ethylene. After an hour the stirrer was switched off, the autoclave vented to atmospheric pressure and the liquid reaction mixture filtered through a 45 μm filter. The coagulate content of the reaction mixture amounted to 1 wt. %.

The solids content was determined by keeping approx. 1 g of filtered aqueous polymer dispersion in an open aluminum crucible having an internal diameter of approx. 3 cm in a drying cabinet at 100° C. and 10 mbar (absolute) until its weight was constant. The aqueous dispersion obtained was stable for several weeks and during this time exhibited no phase separation, settling or coagulate formation whatsoever.

The average particle diameter of the polymer particles was determined by dynamic light scattering of a 0.005 to 0.01 wt. % aqueous dispersion at 23° C. by means of an Autosizer IIC from Malvern Instruments, England. The average diameter from the cumulant evaluation (cumulant z-average) of the measured autocorrelation function (ISO standard 13321) amounted to 330 nm.

The average molecular weight was determined by means of gel permeation chromatography (DIN 55672, 1,2,4-trichlorbenzene, 140 ° C.). $M_w$ was 320,000 g/mol and $M_w/M_n$ was found to be 2.3. The polyethylene had a melting point of 120° C. and was 50% crystalline.

Comparative Example 20 mg of Na$^+$[Ni (phenyl) (triphenylphosphane) ($\kappa^2$P, O (di-phenylphosphino)C(SO$_3^-$)=C(—O) (4-methylphenyl)] were dissolved at room temperature and under an atmosphere of argon in 95 ml of degassed and deionized water containing 0.5 g of sodium dodecylsulfate in solution.

In a second container 3.5 mg of acetylacetonato-bis (ethylene)rhodium(I) (prepared as specified by R. Cramer, Inorg. Synth., 1974, 15, pages 14–18) were dissolved in 5 ml of acetone likewise at room temperature and under an atmosphere of argon.

Under a protective atmosphere of gas the rhodium complex solution in acetone was first of all sucked into a 250 ml steel autoclave followed by the aqueous nickel complex solution. After this, at 30° C. while stirring (500 s$^{-1}$, mechanical stirrer) the system is pressurized with 45 bar ethylene. After an hour the stirrer was switched off, the autoclave vented to atmospheric pressure and the liquid reaction mixture filtered through a 45 μm filter to determine the coagulate content. The coagulate content of the reaction mixture was 1 wt. %. The solids content of the resultant polyethylene dispersion amounted to 5 wt. %. The average polymer particle size was determined as 300 nm. The average molecular weight $M_w$ of the polyethylene obtained was 3,000 g/mol and $M_w/M_n$ was determined as 3.1. No melting point for the polyethylene obtained could be identified by means of DSC.

What is claimed is:

1. A process for the production of an aqueous polymer dispersion which comprises reacting one or more olefinically unsaturated compounds in aqueous medium in the presence of a1) a complex compound of formula Ia and/or Ib

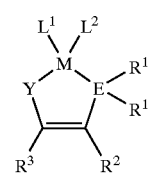

Ia

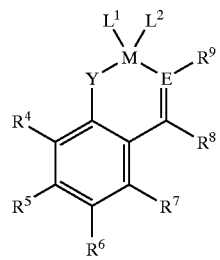

in which the substituents and indices have the following meaning:

M a transition metal of groups 7 to 10 of the periodic system of the elements, $L^1$ phosphanes $(R^{16})_xPH_{3-x}$ or amines $(R^{16})_xNH_{3-x}$ having identical or different substituents $R^{16}$, ethers $(R^{16})_2O$, $H_2O$, alcohols $(R^{16})OH$, pyridine, pyridine derivatives of the formula $C_5H_{5-x}(R^{16})_xN$, CO, $C_1$–$C_{12}$ alkyl nitriles, $C_6$–$C_{14}$ aryl nitriles or ethylenically unsaturated double-bonded systems, x standing for an integer between 0 and 3, $L^2$ halide ions, amide ions $(R^{16})_hNH_{2-h}$, h standing for an integer between 0 and 2, and furthermore $C_1$–$C_6$-alkyl anions, allyl anions, benzyl anions or aryl anions, wherein $L^1$ and $L^2$ can be linked to one another by means of one or more covalent bonds, E nitrogen, Y oxygen, sulfur, N-$R^{10}$ or P-$R^{10}$, $R^1$ hydrogen, $C_1$–$C_{12}$-alkyl groups, $C_7$–$C_{13}$-aralkyl substituents or $C_6$–$C_{14}$ aryl groups, $R^2$, $R^3$ independently of one another hydrogen,
  $C_1$–$C_{12}$ alkyl, wherein the alkyl groups can be branched or unbranched,
  $C_1$–$C_{12}$ alkyl, singly or multiply substituted by identical or different $C_1$–$C_{12}$ alkyl groups, halogens,
  $C_1$–$C_{12}$ alkoxy groups or $C_1$–$C_{12}$ thioether groups,
  $C_7$–$C_{13}$ aralkyl,
  $C_3$–$C_{12}$ cycloalkyl,
  $C_3$–$C_{12}$ cycloalkyl, singly or multiply substituted by identical or different $C_1$–$C_{12}$ alkyl groups, halogens,
  $C_1$–$C_{12}$ alkoxy groups or $C_1$–$C_{12}$ thioether groups,
  $C_6$–$C_{14}$ aryl,
  $C_6$–$C_{14}$ aryl, identically or differently substituted by one or more $C_1$–$C_{12}$ alkyl groups, halogens, singly or multiply halogenated $C_1$–$C_{12}$ alkyl groups, $C_1$–$C_{12}$ alkoxy groups, silyloxy groups $OSiR^{11}R^{12}R^{13}$, amino groups $NR^{14}R^{15}$ or $C_1$–$C_{12}$ thioether groups,
  $C_1$–$C_{12}$ alkoxy groups,
  silyloxy groups $OSiR^{11}R^{12}R^{13}$,
  halogens or
  amino groups $NR^{14}R^{15}$ wherein the substituents $R^2$ and $R^3$ can form a saturated or unsaturated 5- to 8-membered ring with one another, $R^4$ to $R^7$ independently of one another hydrogen,
  $C_1$–$C_{12}$ alkyl, wherein the alkyl groups can be branched or unbranched,
  $C_1$–$C_{12}$ alkyl, singly or multiply substituted by identical or different $C_1$–$C_{12}$ alkyl groups, halogens,
  $C_1$–$C_{12}$ alkoxy groups or $C_1$–$C_{12}$ thioether groups,
  $C_7$–$C_{13}$ aralkyl,
  $C_3$–$C_{12}$ cycloalkyl,
  $C_3$–$C_{12}$ cycloalkyl, singly or multiply substituted by identical or different $C_1$–$C_{12}$ alkyl groups, halogens,
  $C_1$–$C_{12}$ alkoxy groups or $C_1$–$C_{12}$ thioether groups,
  $C_6$–$C_{14}$ aryl,
  $C_6$–$C_{14}$ aryl, identically or differently substituted by one or more $C_1$–$C_{12}$ alkyl groups, halogens, singly or multiply halogenated $C_1$–$C_{12}$ alkyl groups, $C_1$–$C_{12}$ alkoxy groups, silyloxy groups $OSiR^{11}R^{12}R^{13}$, amino groups $NR^{14}R^{15}$ or $C_1$–$C_{12}$ thioether groups,
  $C_1$–$C_{12}$ alkoxy groups,
  silyloxy groups $OSiR^{11}R^{12}R^{13}$,
  halogens
  $NO_2$ groups or
  amino groups $NR^{14}R^{15}$, wherein pairs of neighboring substituents $R^4$ to $R^7$ can form a saturated or unsaturated 5- to 8-membered ring with one another, $R^8$, $R^9$ independently of one another
  hydrogen, $C_1$–$C_6$ alkyl groups, $C_7$–$C_{13}$ aralkyl substituents or
  $C_6$–$C_{14}$ aryl groups, optionally substituted by one or more $C_1$–$C_{12}$ alkyl groups, halogens, singly or multiply halogenated $C_1$–$C_{12}$ alkyl, $C_1$–$C_{12}$ alkoxy groups, silyloxy groups $OSiR^{11}R^{12}R^{13}$, amino groups $NR^{14}R^{15}$ or $C_1$–$C_{12}$ thioether groups, $R^{10}$ to $R^{15}$ independently of one another hydrogen,
  $C_1$–$C_{20}$ alkyl groups, which on their part may be substituted by $O(C_1$–$C_6$ alkyl) or $N(C_1$–$C_6$ alkyl)$_2$ groups,
  $C_3$–$C_{12}$ cycloalkyl groups,
  $C_7$–$C_{13}$ aralkyl substituents or $C_6$–$C_{14}$ aryl groups $R^{16}$ hydrogen
  $C_1$–$C_{20}$ alkyl groups, which for their part may be substituted by $O(C_1$–$C_6$ alkyl) or $N(C_1$–$C_6$ alkyl)$_2$ groups,
  $C_3$–$C_{12}$ cycloalkyl groups,
  $C_7$–$C_{13}$ aralkyl substituents or $C_6$–$C_{14}$ aryl groups b) dispersing agents and optionally c) organic solvents having low solubility in water, d) the metal complexes a1) being dissolved in a portion or the total quantity of the olefinically unsaturated compounds and/or of the organic solvents c) having low solubility in water and e) the portion or the total quantity of the olefinically unsaturated compounds and/or of the organic solvents c) having low solubility in water which holds the metal complexes a1) in solution being present in the aqueous medium as a dispersed phase having an average droplet diameter $\leq 1,000$ nm.

2. The process defined in claim 1, wherein the metal complex a1) is of formula (Ia).

3. The process defined in claim 1, wherein the average droplet diameter of the disperse phase in (e) is $\leq 700$ nm.

4. The process defined in claim 1, wherein the average droplet diameter of the disperse phase in (e) is $\leq 40$ nm.

5. The process defined in claim 1, wherein the average droplet diameter of the disperse phase in (e) is $\leq 500$ nm.

6. The process defined in claim 1, wherein the average droplet diameter of the disperse phase in (e) is from 100 to 400 nm.

7. The process defined in claim 1, wherein the metal complex a1) is used in combination with an activator a2).

8. The process defined in claim 1, wherein an electrically neutral nickel complex compound is used as the complex compound of the general formula Ia and/or Ib.

9. The process defined in claim 7, wherein the activator a2) is an olefin complex of rhodium or nickel.

10. The process defined in claim 1, wherein ethylene is used exclusively as olefinically unsaturated compound.

11. The process defined in claim 1, wherein at least two olefinically unsaturated compounds selected from the group consisting of ethylene, propylene, 1-butene, 1-hexene and styrene are used.

12. The process defined in claim 11, wherein ethylene is used in combination with propylene, 1-butene, 1-hexene or styrene.

13. The process defined in claim 1, where anionic, cationic and/or non-ionic emulsifiers are employed as the dispersing agents b).

14. The process defined in claim 1, wherein aliphatic and aromatic hydrocarbons, fatty alcohols and/or fatty acid esters are used as the organic solvents c).

15. The process defined in claim 1, wherein the portion or the total quantity of the olefinically unsaturated compounds and/or of the organic solvents c) having low solubility in water which contains the metal complexes a1) in solution and which is present in the aqueous medium as a disperse phase having an average droplet diameter $\leq 1,000$ nm contains further components.

* * * * *